United States Patent
Fader et al.

(10) Patent No.: US 9,522,597 B2
(45) Date of Patent: Dec. 20, 2016

(54) METHODS AND SYSTEM FOR PROVIDING VEHICLE PERFORMANCE FEEDBACK

(71) Applicant: Ford Global Technologies, LLC, Dearborn, MI (US)

(72) Inventors: Hugh Fader, Royal Oak, MI (US); James William Loch McCallum, Ann Arbor, MI (US); Seunghoon Lee, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/637,154

(22) Filed: Mar. 3, 2015

(65) Prior Publication Data
US 2016/0257197 A1    Sep. 8, 2016

(51) Int. Cl.
*B60Q 1/00* (2006.01)
*B60K 26/02* (2006.01)
*F16H 61/16* (2006.01)
*F16H 61/68* (2006.01)

(52) U.S. Cl.
CPC ............ *B60K 26/021* (2013.01); *F16H 61/16* (2013.01); *F16H 61/68* (2013.01); *B60K 2026/022* (2013.01); *B60K 2026/023* (2013.01)

(58) Field of Classification Search
CPC ...... B60W 10/06; B60W 10/08; B60W 20/00; B60K 26/021; B60K 2026/022; B60K 2026/023; F16H 61/16; F16H 61/68
USPC .................. 340/441; 701/36, 70, 99
See application file for complete search history.

(56) References Cited

U.S. PATENT DOCUMENTS

| | | | |
|---|---|---|---|
| 7,603,228 B2 | 10/2009 | Coughlin | |
| 7,798,578 B2 | 9/2010 | Lewis et al. | |
| 8,290,697 B2 | 10/2012 | Coughlin | |
| 8,560,144 B2 | 10/2013 | McGrogan | |
| 8,836,493 B2 | 9/2014 | Thiel et al. | |
| 2008/0265662 A1* | 10/2008 | Karnjate | B60T 7/06 701/70 |
| 2011/0288741 A1 | 11/2011 | Schaffeld et al. | |
| 2012/0169488 A1 | 7/2012 | Thiel et al. | |
| 2015/0127234 A1* | 5/2015 | Wagner | B60K 26/021 701/70 |
| 2015/0239456 A1* | 8/2015 | Liggins | B60K 28/16 701/37 |
| 2015/0266479 A1* | 9/2015 | Blakeway | B60W 10/06 477/92 |

* cited by examiner

*Primary Examiner* — Thomas Mullen
(74) *Attorney, Agent, or Firm* — Julia Voutyras; Alleman Hall McCoy Russell & Tuttle LLP

(57) ABSTRACT

Systems and methods for supplying feedback to a driver of a vehicle so that transmission shifting busyness may be reduced are presented. In one example, the systems and methods include increasing resistance of an accelerator pedal in response to a difference between an available powertrain torque and a desired powertrain torque.

19 Claims, 5 Drawing Sheets

METHODS AND SYSTEM FOR PROVIDING VEHICLE PERFORMANCE FEEDBACK

FIELD

The present description relates to methods and a system for providing performance feedback for a vehicle. The methods and systems may be particularly useful for vehicles that include a turbocharger for increasing engine performance.

BACKGROUND AND SUMMARY

A driver may increase a torque demand to accelerate a vehicle. Although the driver may wish for immediate torque production, a vehicle powertrain may develop the requested torque over time. For example, a powertrain that includes a turbocharged engine may increase torque output over several seconds after an increase in driver-demanded powertrain torque. Output of the turbocharged engine may increase as turbocharger compressor speed increases, and it may take several seconds for the compressor to achieve a speed where a desired amount of boost is provided to the engine. However, engine output may eventually provide the requested torque. Some drivers may become impatient and further increase the torque demand in an attempt to achieve the desired torque sooner. The increased torque demand may initiate a transmission downshift to provide the requested torque. Yet, the downshift may decrease vehicle fuel economy and increase shift busyness even though the powertrain may have provided the desired torque absent the downshift if the vehicle had been allowed to accelerate for a short time longer before the downshifting commenced.

The inventors herein have recognized the above-mentioned issue and have developed a driver feedback method, comprising: increasing accelerator pedal application resistance in response to a decreasing difference in available powertrain torque and desired powertrain torque.

By increasing accelerator pedal application resistance in response to a decreasing difference between available powertrain torque (e.g., maximum powertrain torque at the present powertrain speed) and desired powertrain torque, it may be possible to provide feedback to a vehicle's driver that a further increase in desired torque may result in a transmission downshift or that the desired torque may be provided if the driver shows a small amount of patience. For example, application resistance of an accelerator pedal may be increased to require a driver to apply more force to request higher demand torques as driver-demanded powertrain torque increases and approaches an available powertrain torque. In some examples, the application resistance of the accelerator pedal may be further increased as driver-demanded powertrain torque approaches a torque where a transmission in the powertrain is downshifted. In this way, the driver may be notified that a downshift will occur if the driver continues to increase the demand torque. The driver may then show patience and reduce the rate of driver-demanded powertrain torque increase, or alternatively, the driver may continue to increase driver demand and expect a transmission downshift to increase vehicle acceleration.

In other examples, accelerator pedal application resistance to motion may be increased in response to an increasing difference between actual powertrain torque (e.g., actual torque delivered by the powertrain) and desired powertrain torque (e.g., powertrain torque that is demanded by a driver, for example). By increasing accelerator pedal application resistance to motion in response to an increasing difference between actual powertrain torque and desired powertrain torque, accelerator pedal resistance may be selectively increased during conditions where actual powertrain torque lags desired powertrain torque. In this way, the driver may be notified that additional powertrain torque may be produced at the present driver-demanded powertrain torque provided the driver shows a small amount of patience.

The present description may provide several advantages. In particular, the approach may provide reduced shift busyness. Further, the approach may improve a driver's perception of the vehicle driving experience by providing the driver enhanced vehicle feedback. Further still, the approach may be useful for training a driver to better distinguish between driving for performance and driving for fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
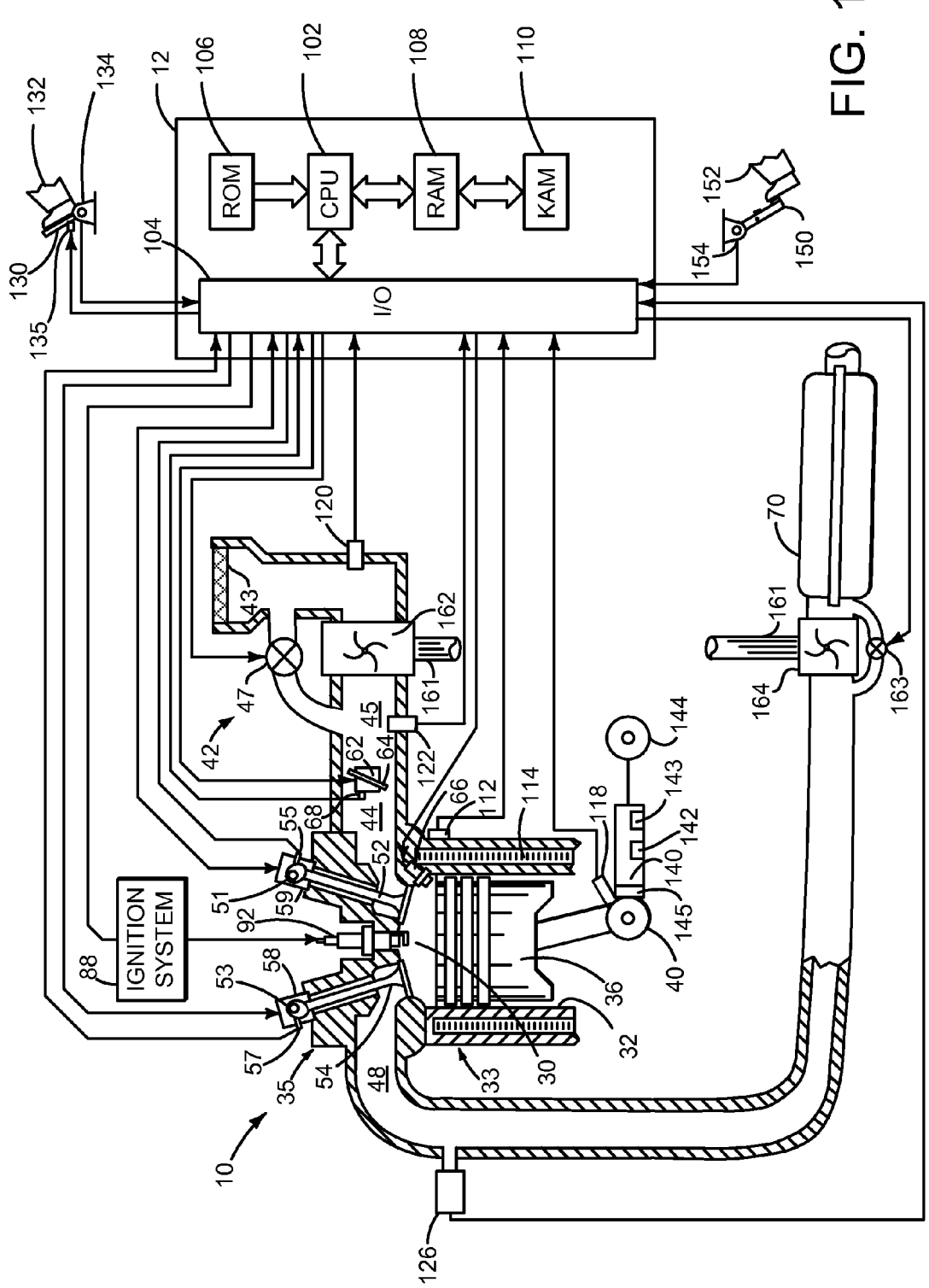
FIG. 1 is a schematic diagram of vehicle powertrain including an engine.
Figure 2A:
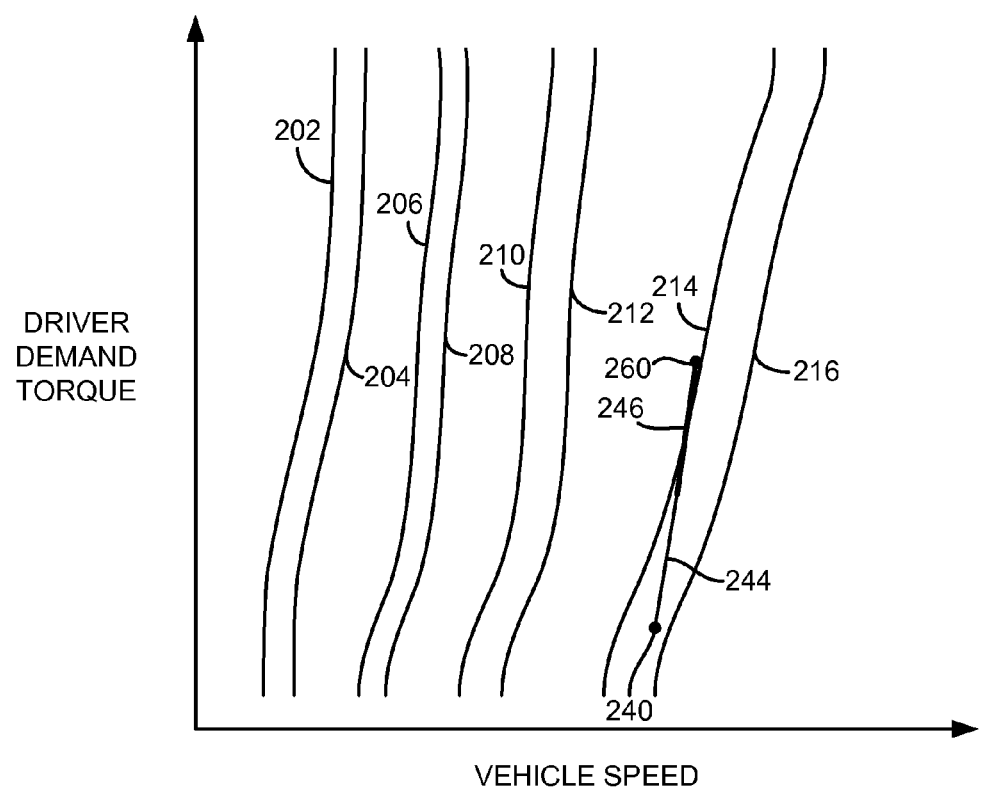
FIG. 2A is a plot of an example transmission gear shift schedule.
Figure 2B:
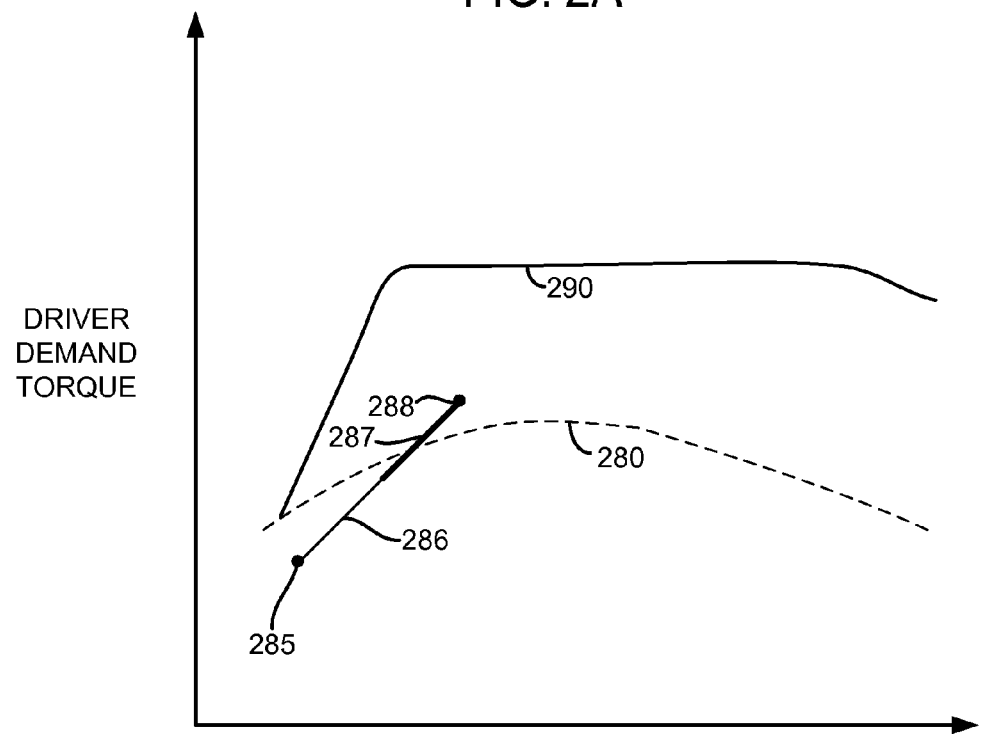
FIG. 2B is a plot of example engine torque curves.

The present description is related to providing vehicle performance feedback to a driver of a vehicle. The vehicle may include a powertrain including an engine as is shown in FIG. 1. The powertrain of FIG. 1 includes a transmission that includes a shift schedule as is shown in FIG. 2A. Further, the powertrain of FIG. 1 includes an engine having boosted and non-boosted torque curves as is shown in FIG. 2B. The powertrain and accelerator pedal may operate according to the operating sequence shown in FIG. 3. Vehicle performance information may be provided to a driver as illustrated in the block diagram of FIG. 4. A method for providing a driver vehicle performance feedback via an accelerator pedal is shown in FIG. 5.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Crankshaft 40 is shown coupled to torque converter 145 which is included in automatic transmission 140 (e.g., fixed ratio or CVT). Transmission 140 may shift gears 142 to change a speed at which engine 10 rotates with respect to vehicle wheels 144. Gears 142 may include a plurality of fixed ratio gears. Further, transmission 140 may include a plurality of gear clutches 143 that may be engaged as needed to activate a plurality of fixed transmission gear ratios. Specifically, by adjusting the engagement of the plurality of gear clutches 143, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have eight available gears, where transmission gear eight (transmission eighth gear) is the highest available gear and transmission gear one (transmission first gear) is the lowest available gear. In other examples, the vehicle may have more or less than eight available gears.

Driver-demanded powertrain torque may be input to controller 12 via accelerator pedal 130. Haptic actuator 135 selectively increases and decreases an amount of force needed to apply (e.g., increase) accelerator pedal 130. Thus, haptic actuator 135 selectively provides increased or decreased resistance to motion of accelerator pedal 130 in response to commands from controller 12.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced electronic pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an accelerator pedal; a powertrain including an engine; a haptic actuator to increase and decrease resistance to applying the accelerator pedal; and a controller including executable instructions stored in non-transitory memory for increasing accelerator pedal application resistance proportionately to a decreasing difference between available powertrain torque and predicted driver-demanded powertrain torque. Alternatively, the system may include instructions in non-transitory memory for increasing accelerator pedal application resistance to motion proportionately to an increasing difference between actual powertrain torque and desired powertrain torque.

In some examples, the system further comprises additional instructions to inhibit downshifting a transmission for a predetermined amount of time in response to the decreasing difference between available powertrain torque and predicted driver-demanded powertrain torque. Alternatively, the system further comprises additional instructions to inhibit downshifting a transmission for a predetermined amount of time in response to the increasing difference between actual powertrain torque and desired powertrain torque. The system includes where the predetermined amount of time is based on engine speed and driver-demanded powertrain torque. The system further comprises additional instructions for downshifting a transmission in response to the decreasing difference between available powertrain torque and desired powertrain torque being less than a threshold. The system further comprises additional instructions for ceasing to increase accelerator pedal application resistance in response to the decreasing difference between available powertrain torque and desired powertrain torque being less than a threshold.

FIG. 2A is a plot of an example transmission gear shift schedule. In this example, shifting boundary curves for five gear sets are shown. The shifting boundary curves are based on vehicle speed and demand torque. The vertical axis represents driver-demanded powertrain torque. The driver-demanded powertrain torque may represent a demanded engine torque or a demanded wheel torque depending on system design. Driver-demanded powertrain torque may also be referred to as desired powertrain torque, desired engine torque, demanded engine torque, demanded powertrain torque, demanded wheel torque, or desired wheel torque depending on system design. Demanded engine torque may be determined from demanded wheel torque and vice-versa. The horizontal axis represents vehicle speed.

Curve 202 represents vehicle conditions for downshifting from second gear to first gear when curve 202 is approached from vehicle operating conditions to the right of curve 202. For example, if vehicle speed decreases to a speed less than or equal to a speed represented by curve 202 from a condition where the transmission is in second gear and vehicle speed is to the right of curve 202, the transmission may be automatically downshifted to first gear.

Curve 204 represents vehicle conditions for upshifting from first gear to second gear when curve 204 is approached from vehicle operating conditions to the left of curve 204. For example, if vehicle speed increases to a speed greater than or equal to a speed represented by curve 204 from a condition where the transmission is in first gear and vehicle speed is to the left of curve 204, the transmission may be automatically upshifted to second gear.

Curve 206 represents vehicle conditions for downshifting from third gear to second gear when curve 206 is approached from vehicle operating conditions to the right of curve 206. For example, if vehicle speed decreases to a speed less than or equal to a speed represented by curve 206 from a condition where the transmission is in third gear and vehicle speed is to the right of curve 206, the transmission may be automatically downshifted to second gear.

Curve 208 represents vehicle conditions for upshifting from second gear to third gear when curve 208 is approached from vehicle operating conditions to the left of curve 208. For example, if vehicle speed increases to a speed greater than or equal to a speed represented by curve 208 from a condition where the transmission is in second gear and vehicle speed is to the left of curve 208, the transmission may be automatically upshifted to third gear.

Curve 210 represents vehicle conditions for downshifting from fourth gear to third gear when curve 210 is approached from vehicle operating conditions to the right of curve 210. For example, if vehicle speed decreases to a speed less than or equal to a speed represented by curve 210 from a condition where the transmission is in fourth gear and vehicle speed is to the right of curve 210, the transmission may be automatically downshifted to third gear.

Curve 212 represents vehicle conditions for upshifting from third gear to fourth gear when curve 212 is approached from vehicle operating conditions to the left of curve 212. For example, if vehicle speed increases to a speed greater than or equal to a speed represented by curve 212 from a condition where the transmission is in third gear and vehicle speed is to the left of curve 212, the transmission may be automatically upshifted to fourth gear.

Curve 214 represents vehicle conditions for downshifting from fifth gear to fourth gear when curve 214 is approached from vehicle operating conditions to the right of curve 214. For example, if vehicle speed decreases to a speed less than or equal to a speed represented by curve 214 from a condition where the transmission is in fifth gear and vehicle speed is to the right of curve 214, the transmission may be automatically downshifted to fourth gear.

Curve 216 represents vehicle conditions for upshifting from fourth gear to fifth gear when curve 216 is approached from vehicle operating conditions to the left of curve 216. For example, if vehicle speed increases to a speed greater than or equal to a speed represented by curve 216 from a condition where the transmission is in fourth gear and vehicle speed is to the left of curve 216, the transmission may be automatically upshifted to fifth gear.

In this way, gears of an automatic transmission may be shifted so that an engine or electric motor may remain within a desired operating range (e.g., between upper and lower speed bounds and between upper and lower torque bounds) where powertrain operation is efficient and provides expected output.

FIG. 2A also shows one example of how accelerator pedal resistance may be adjusted to provide a driver vehicle performance feedback. If a driver applies the accelerator pedal to increase demanded torque from conditions at 240 to conditions at 260, the accelerator pedal resistance to application (e.g., resistance to motion in an increasing direction) increases at a first rate as indicated by line segment 244. However, when the demanded torque is within a threshold torque of downshift curve 214, the accelerator pedal resistance to motion is increased at a second rate, the second rate greater than the first rate, as indicated by line segment 246. The increase in accelerator pedal resistance to motion notifies the driver that a transmission gear downshift is impending if the torque demand continues to increase. Thus, the driver may choose to reduce a rate of torque demand increase to avoid a transmission gear downshift, which may improve vehicle fuel economy. Alternatively, the driver may choose to continue to request torque at a same or higher rate to induce a transmission gear downshift to increase vehicle acceleration. In this way, the accelerator pedal provides the driver feedback as to the presence or absence of an impending gear downshift.

FIG. 2B is a plot of an example powertrain torque production. In this example, engine output torque for boosted (e.g., turbocharged) and non-boosted (e.g., turbocharger is providing less than a threshold amount of pressurized air to the engine air intake) operation is shown. Curve 280 represents engine torque output when the engine is operating non-boosted. Curve 290 represents engine torque output when the engine is operated in a boosted mode. The engine operates in a boosted mode to provide torques between curves 280 and 290. The engine operates non-boosted to provide torques below curve 290. The engine torque output is significantly higher in a boosted mode as compared to operating the engine non-boosted, but engine fuel economy may decrease when the engine is operating in a boosted mode. Powertrain torque production curves for wheel torque in each transmission gear would show similarly shaped curves for boosted and non-boosted operation.

FIG. 2B also shows one example of how accelerator pedal resistance may be adjusted to provide a driver vehicle performance feedback. If a driver applies the accelerator pedal to increase demanded torque from operating conditions at 285 to conditions at 288, the accelerator pedal resistance to application (e.g., resistance to motion in an increasing direction) increases at a first rate as indicated by line segment 286. However, when the demanded torque is within a threshold torque of non-boosted curve 280, the accelerator pedal resistance is increased to a second rate, the second rate greater than the first rate, as indicated by line segment 287. The increase in accelerator pedal resistance notifies the driver that the engine will enter boosted operation if the torque demand continues to increase. Thus, the driver may choose to reduce a rate of torque demand increase to avoid boosted operation, which may improve vehicle fuel economy. Alternatively, the driver may choose to continue to request torque at a same or higher rate to induce boosted engine operation to increase vehicle acceleration. In this way, the accelerator pedal provides the driver feedback as to the presence or absence of impending boosted operation (e.g., pressurizing air to the engine air intake above atmospheric pressure).

Figure 3:
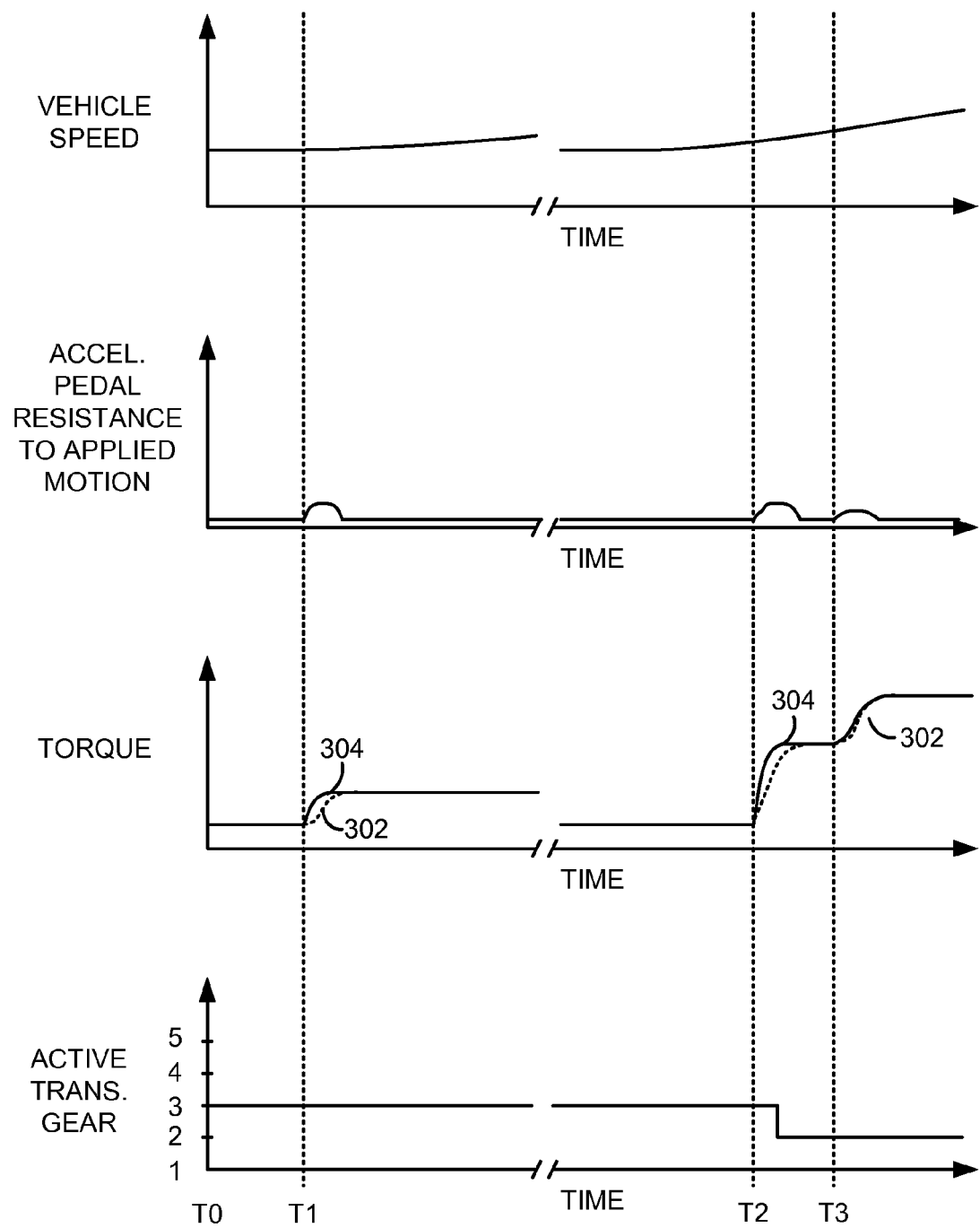
FIG. 3 is a plot of a simulated driving sequence.

Referring now to FIG. 3, a plot of a simulated driving sequence is shown. The driving sequence of FIG. 3 may be provided by the system of FIG. 1 operating according to the method of FIG. 5. Vertical markers T0-T3 represent times of particular interest in the sequence. Breaks in the time line are represented by // and the amount of time between the double slashes may be long or short.

The first plot from the top of FIG. 3 is a plot of vehicle speed versus time. The vertical axis represents vehicle speed and vehicle speed increases in the direction of the vertical axis arrow. The horizontal axis represents time and time increases from the left side of the plot to the right side of the plot.

The second plot from the top of FIG. 3 is a plot of accelerator pedal resistance to motion versus time. The vertical axis represents accelerator pedal resistance to motion (e.g., Nm/degree) and accelerator pedal resistance to motion increases in the direction of the vertical axis arrow. The horizontal axis represents time and time increases from the left side of the plot to the right side of the plot.

The third plot from the top of FIG. 3 is a plot of torque versus time. The vertical axis represents torque and torque increases in the direction of the vertical axis arrow. The horizontal axis represents time and time increases from the left side of the plot to the right side of the plot. Dotted line 302 represents actual powertrain torque (e.g., engine torque or wheel torque) based on engine speed and intake manifold pressure, for example. Solid line 304 represents desired powertrain torque or driver-demanded powertrain torque that is based on accelerator pedal position. Actual powertrain torque and driver-demanded powertrain torque are equal when only solid line 304 is visible.

The fourth plot from the top of FIG. 3 is a plot of transmission gear versus time. The vertical axis transmission gear and the respective transmission gears are indicated along the vertical axis. The horizontal axis represents time and time increases from the left side of the plot to the right side of the plot.

At time T0, vehicle speed is at a middle level and accelerator pedal resistance is at a lower level. The driver torque demand is at a lower level and the transmission is operating in third gear.

At time T1, the driver applies (e.g., depresses) the accelerator pedal to increase a torque demand and accelerate the vehicle. The driver-demanded powertrain torque increases at a rate faster than the actual powertrain torque since it may take time for the turbocharger to build intake manifold pressure and engine torque. The transmission remains in third gear because the increase in demand torque is less than a demand to initiate a transmission downshift. The vehicle accelerates and engine boost pressure (not shown) is increased to increase engine output. The increased accelerator pedal resistance provides an indication to the driver that boost is activated and being used to accelerate the vehicle. The accelerator pedal resistance to motion decreases as the difference between actual powertrain torque and driver-demanded powertrain torque decreases. A break in the operating sequence occurs at the double slashes between time T1 and time T2.

At time T2, the driver applies the accelerator pedal for a second time from same operating conditions as at time T1. However, the driver applies the accelerator pedal further than at time T1, thereby increasing the actual powertrain torque and driver-demanded powertrain torque to higher levels than at time T1. The accelerator pedal resistance to motion is increased to a first rate, and then, it is increased at a second higher rate. The first rate provides an indication to the driver that boost is being increased to meet the driver-demanded powertrain torque. The second rate provides an indication to the driver that a transmission downshift is imminent if torque continues to increase. Shortly thereafter, the transmission is downshifted to second gear to increase vehicle acceleration. The accelerator pedal resistance to motion decreases as the difference between actual powertrain torque and driver-demanded powertrain torque decreases.

At time T3, the driver increases the driver-demanded powertrain torque a third time, but in this case the transmission has already downshifted and the turbocharger is supplying some boost. Therefore, the accelerator pedal resistance to motion is increased only a small amount. The transmission continues in second gear and the vehicle continues to accelerate.

In this way, the accelerator pedal may provide tactile feedback to a driver of vehicle performance characteristics such as boost activation and downshifting. Additionally, the accelerator pedal may provide different levels or rates of tactile feedback to differentiate between vehicle performance effectors.

Figure 4:
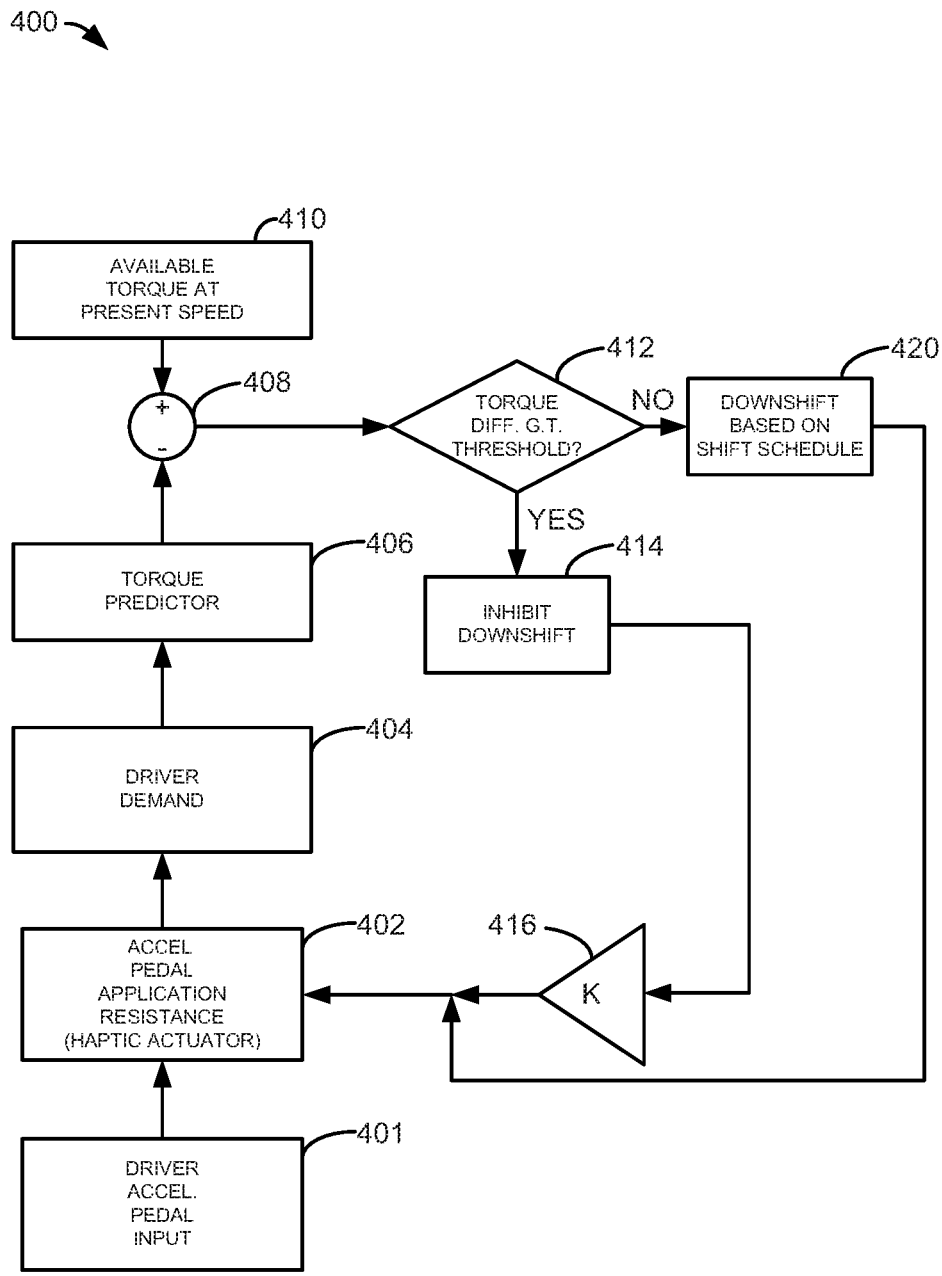
FIG. 4 is a control block diagram of a system for providing driver feedback.
Figure 5:
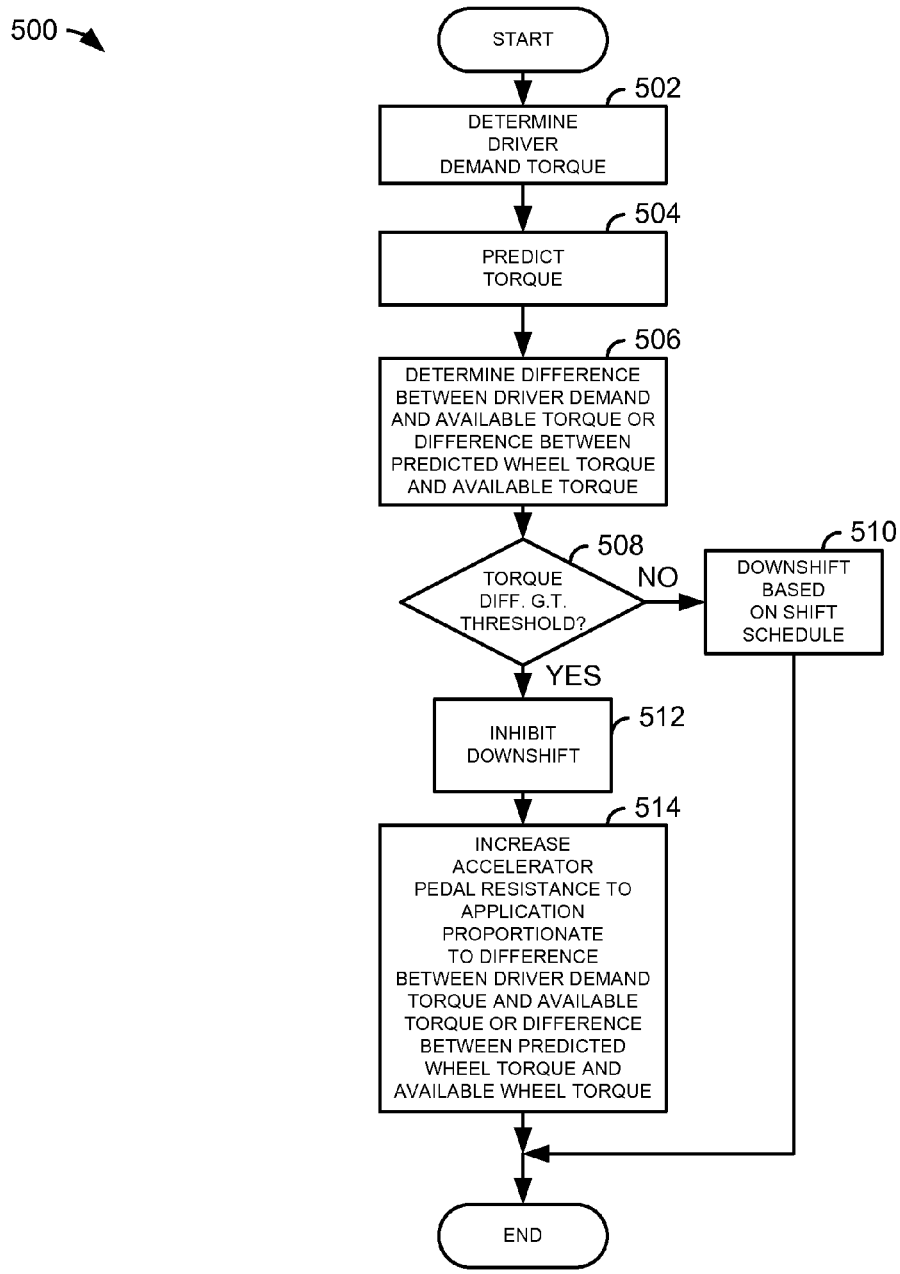
FIG. 5 is an example method for providing vehicle performance feedback to a driver.

Referring now to FIG. 4, a block diagram of a control system for providing tactile vehicle performance feedback to a driver is shown. The control system may be part of the system shown in FIG. 1.

At block 401 driver input is accepted to the control system via an accelerator pedal. The accelerator pedal includes a haptic device for increasing resistance to accelerator pedal motion away from a base position when the accelerator pedal position is increasing (e.g., being depressed). The haptic device allows the accelerator pedal to return to a base position at a rate that is not affected by the resistance to accelerator pedal motion.

At block 402, the system adjusts accelerator pedal resistance to accelerator pedal motion responsive to a difference between an available powertrain torque and a desired powertrain torque. Alternatively, the system adjusts accelerator pedal resistance to accelerator pedal motion responsive to a difference between actual powertrain torque (e.g., torque produced by the powertrain) and desired powertrain torque or driver-demanded powertrain torque as is shown in FIG. 3. In some examples, block 402 may adjust accelerator pedal resistance to accelerator pedal motion responsive to a difference between an available powertrain torque and a predicted desired powertrain torque. Alternatively, block 402 may adjust accelerator pedal resistance to accelerator pedal motion responsive to a difference between desired powertrain torque or driver-demanded powertrain torque and predicted actual powertrain torque. The predicted actual powertrain torque may be determined as further elaborated in the description of FIG. 5. The actual powertrain torque may be an engine output torque, a torque converter impeller torque, a wheel torque, or other torque produced via a powertrain or driveline. Block 402 may further adjust accelerator pedal resistance to accelerator pedal motion in response to the desired powertrain torque being within a threshold torque of a transmission shift schedule torque. Block 402 may further adjust accelerator pedal resistance to accelerator pedal motion in response to desired powertrain torque being within a threshold torque of a torque where boosted engine operation begins (e.g., a positive pressure is applied to the engine intake manifold).

At block 404, the control system converts accelerator pedal position into a driver-demanded powertrain torque or desired powertrain torque. The driver-demanded powertrain torque may be an engine torque, a torque converter impeller torque, a wheel torque or another torque along a driveline or powertrain. Block 404 may include a transfer function that relates accelerator pedal position and vehicle speed to a driver-demanded powertrain torque. The output of block 404 is input to block 406.

At block 410, method 400 determines an available torque at a present driveline speed. If desired demand torque is a desired engine torque or torque converter impeller torque, block 410 may determine the available torque as the maximum engine torque at the present engine speed (e.g., wide open throttle engine torque with boost activated and providing pressurized air to the engine intake manifold). Maximum engine torque may be determined empirically and stored in tables or functions based on engine speed. If the desired demand torque is a wheel torque, the available torque is the maximum wheel torque at the present wheel speed with the transmission in the present gear, the engine operating at wide open throttle, boost activated and providing pressurized air to the engine intake manifold. Maximum wheel torque may be determined empirically and stored in tables or functions based on wheel speed, selected transmission gear, and torque converter state.

At summing junction 408, the desired powertrain torque is subtracted from the available powertrain torque to provide a torque difference. The torque difference is passed to block 412 where it is judged whether or not the torque difference is greater than one or more thresholds. In one example, the threshold difference indicates the desired powertrain torque is approaching a transmission downshift torque. In another example, the threshold difference indicates the desired powertrain torque is approaching a torque where the engine is operated in a boosted mode from a condition where the engine is not operated in a boosted mode. If the torque difference is greater than a threshold, the answer is yes and the torque difference is passed to block 414. Otherwise, the control flow passes to block 420.

Alternatively, block 406 may be eliminated and actual powertrain torque may instead be determined at 410. For example, actual engine torque may be estimated based on engine speed and intake manifold pressure. In particular, engine speed and intake manifold pressure index a table of empirically determined engine torque output values. The table outputs the torque value as the actual engine torque. At summing junction 408, the actual powertrain torque may be subtracted from the desired powertrain torque or driver-demanded powertrain torque. The torque difference is provided to block 412. If it is judged at 412 that the torque difference is greater than a threshold, the answer is yes and the torque difference is passed to block 414. Otherwise, the control flow passes to block 420.

At 414, transmission downshifting is inhibited so that the turbocharger is given time to provide the desired torque and reduce fuel consumption. Control flow and the torque difference value is passed to block 416.

At 416, a proportionate gain is applied to the difference between desired or predicted driver-demanded powertrain torque and the available torque to determine a haptic accelerator pedal adjustment. The haptic accelerator pedal adjustment increases or decreases the accelerator pedal's resistance to accelerator pedal motion. In one example, as the torque difference decreases the accelerator pedal's resistance to accelerator pedal motion increases. The accelerator pedal resistance adjustment is applied to the haptic accelerator pedal at block 402.

Alternatively at 416, a proportionate gain is applied to the difference between actual powertrain torque and the desired powertrain torque to determine a haptic accelerator pedal adjustment. In one example, as the torque difference increases the accelerator pedal's resistance to accelerator pedal motion increases. The accelerator pedal resistance adjustment is applied to the haptic accelerator pedal at block 402.

At 420, method 400 downshifts the transmission based on a transmission downshift schedule (e.g., as is shown in FIG. 2). The downshift may provide a further increase in the vehicle's acceleration rate. The control flow returns to block 402 after engine downshifting is provided.

Referring now to FIG. 5, a method for providing vehicle performance feedback to a driver is shown. The method may be incorporated into the system of FIG. 1 as executable instructions stored in non-transitory memory. Additionally, the method of FIG. 5 may provide the operating sequences of FIG. 4.

At 502, method 400 determines driver-demanded powertrain torque. Driver-demanded powertrain torque may be a demanded engine torque, wheel torque, torque converter impeller torque, or other torque of a powertrain or driveline. In one example, driver-demanded powertrain torque is determined via a position of an accelerator pedal and vehicle speed. The accelerator pedal position and vehicle speed index a transfer function that outputs a driver-demanded powertrain torque. Method 500 proceeds to 504 after the driver-demanded powertrain torque is determined.

At 504, method 500 determines predicted actual powertrain torque. In one example, the actual powertrain torque is predicted based on the driver-demanded powertrain torque. In particular, the driver-demanded powertrain torque is passed through an engine model. In one example, powertrain torque production may be modeled by applying a low pass filter to the driver-demanded powertrain torque. A filter coefficient may be adjusted based on engine speed and/or other powertrain parameters. Method 500 proceeds to 506 after predicted actual powertrain torque is determined.

At 506, method 500 determines a difference between driver-demanded powertrain torque and available torque. Alternatively at 506, a difference between predicted actual powertrain torque and available torque is determined. If driver-demanded powertrain torque is engine output torque, then available torque is based on engine output torque. Similarly, if driver-demanded powertrain torque is wheel torque, then available torque is based on wheel output torque. Wheel torque may be converted to engine torque and vice-versa. For example, engine torque may be converted to wheel torque by determining engine torque based on engine speed and engine air flow amount, the engine torque is then multiplied by the present transmission gear ratio, axle ratio, driveline efficiency, and torque converter torque multiplication factor (e.g., 1 for a locked torque converter).

If desired demand torque is a desired engine torque or torque converter impeller torque, the available torque may be determined as the maximum engine torque at the present engine speed (e.g., wide open throttle engine torque with boost activated and providing pressurized air to the engine intake manifold). Maximum engine torque may be determined empirically and stored in tables or functions based on engine speed. On the other hand, if the desired demand torque is a wheel torque, the available torque is the maximum wheel torque at the present wheel speed with the transmission in the present gear, the engine operating at wide open throttle, boost activated and providing pressurized air to the engine intake manifold. Maximum wheel torque may be determined empirically and stored in tables or functions based on wheel speed, selected transmission gear, and torque converter state, or it may be back-calculated based on multiplying the maximum engine torque at the present engine speed by transmission gear ratio, powertrain efficiency, axle ratio, and torque converter torque multiplication ratio. Method 500 subtracts the driver-demanded powertrain torque or predicted driver-demanded powertrain torque from the available torque to determine the difference in torque. Method 500 proceeds to 508 after the difference in torque is determined.

Alternatively at 506, method 500 determines a difference between the actual powertrain torque and the desired powertrain torque, or a difference between the predicted actual powertrain torque and the desired powertrain torque. In particular, the actual powertrain torque is subtracted from the desired powertrain torque, or the predicted actual powertrain torque is subtracted from the desired powertrain torque to provide a difference in torque.

At 508, method 500 judges whether or not the difference from 506 is greater than one or more thresholds. In one example, the threshold difference indicates the desired torque or predicted torque is approaching a transmission downshift torque. In another example, the threshold difference indicates the desired torque or predicted torque is approaching a torque where the engine is operated in a boosted mode from a condition where the engine is not operated in a boosted mode. By basing the threshold as being within a threshold torque of a torque where the transmission is downshifted and/or within a threshold torque of where boosted engine operation begins from non-boosted engine operation, accelerator pedal resistance to accelerator pedal motion may be adjusted to provide vehicle performance feedback to a driver. If method 500 judges that the torque difference is greater than a threshold, the answer is yes and method 500 proceeds to 512. Otherwise, the answer is no and method 500 proceeds to 510.

At 512, method 500 inhibits transmission downshifting. Transmission downshifting may be inhibited for a predetermined amount of time if the torque difference is greater than a predetermined torque away from where a transmission is downshifted. The predetermined amount of time may be based on engine speed and driver-demanded powertrain torque so that engine torque production may increase before the downshift so that the driver may experience the building torque provided via the turbocharger. Method 500 proceeds to 514 after step 512 completes.

At 514, method 500 increases accelerator pedal resistance in response to accelerator pedal motion. In one example, a voltage or current supplied to a haptic accelerator resistance control device is adjusted proportionately to the difference between driver-demanded powertrain torque or predicted actual powertrain torque and available torque. Additionally or alternatively, the accelerator pedal resistance to accelerator pedal motion may be adjusted responsive to torque being within a threshold torque of where boosted engine operation begins. Additionally or alternatively, the accelerator pedal resistance to accelerator pedal motion may be adjusted responsive to torque being within a threshold torque of where a transmission downshift is scheduled. The rate of accelerator pedal resistance may be greater when torque approaches a torque where the transmission is downshifted as compared to accelerator pedal resistance when torque approaches a torque where boosted engine operation begins. Thus, there may be different rates of accelerator pedal resistance for different vehicle performance characteristics and the driver may distinguish between different performance conditions based on the different rates of accelerator pedal resistance. Method 500 proceeds to exit after 514.

Alternatively at 514, method 500 increases accelerator pedal resistance proportionately to the difference between actual powertrain torque or predicted actual powertrain torque and driver-demanded powertrain torque. Additionally or alternatively, the accelerator pedal resistance to accelerator pedal motion may be adjusted responsive to torque being within a threshold torque of where boosted engine operation begins. Additionally or alternatively, the accelerator pedal resistance to accelerator pedal motion may be adjusted responsive to torque being within a threshold torque of where a transmission downshift is scheduled. The rate of accelerator pedal resistance may be greater when torque approaches a torque where the transmission is downshifted as compared to accelerator pedal resistance when torque approaches a torque where boosted engine operation begins. Method 500 proceeds to exit after 514.

At 510, method 500 downshifts the transmission based on a predetermined transmission downshift schedule. Further, the increase in accelerator pedal resistance may cease. The torque the transmission downshifts at may be unique for each gear ratio. Method 500 proceeds to exit after 510 completes.

Thus, the method of FIG. 5 provides for a driver feedback method, comprising: increasing accelerator pedal application resistance in response to a decreasing difference between available powertrain torque and desired powertrain torque. The method includes where the accelerator pedal application resistance is increased proportionate to the decreasing difference in available powertrain torque. The method further comprises inhibiting downshifting for a predetermined amount of time in response to the decreasing difference between available powertrain torque and desired powertrain torque being greater than a threshold. The method includes where the predetermined amount of time is based on engine speed and driver-demanded powertrain torque.

In some examples, the method further comprises downshifting in response to the decreasing difference between available powertrain torque and desired powertrain torque being less than a threshold. The method further comprises ceasing to increase accelerator pedal application resistance in response to the decreasing difference between available powertrain torque and desired powertrain torque being less than a threshold. The method includes where increasing accelerator pedal application resistance increases effort to apply the accelerator pedal to request additional torque.

The method of FIG. 5 also provides for a driver feedback method, comprising: increasing accelerator pedal application resistance in response to an increasing difference between actual powertrain torque and desired powertrain torque. The method further comprises filtering the desired powertrain torque. The method includes where the desired powertrain torque is filtered via a low pass filter. The method further comprises increasing the accelerator pedal application resistance in response to the desired powertrain torque being within a threshold torque of a torque where a transmission is downshifted. The method includes where increasing the accelerator pedal application resistance includes increasing the accelerator pedal application resistance at an increased rate as compared to a rate the accelerator pedal application resistance is increased when the desired powertrain torque is away from the torque where the transmission is downshifted than the threshold torque. The method further comprises inhibiting downshifting for a predetermined amount of time in response to the increasing difference between actual powertrain torque and desired powertrain torque being less than a threshold. The method further comprises downshifting a transmission in response to the increasing difference between actual powertrain torque and desired powertrain torque being greater than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for providing feedback from a vehicle powertrain to a foot of a driver of the vehicle powertrain, comprising:
   increasing accelerator pedal application resistance to provide the feedback to the driver in response to a decreasing difference between available powertrain torque and desired powertrain torque.

2. The method of claim 1, where the accelerator pedal application resistance is increased proportional to the decreasing difference between available powertrain torque and desired powertrain torque.

3. The method of claim 1, further comprising inhibiting downshifting for a predetermined amount of time in response to the decreasing difference between available powertrain torque and desired powertrain torque.

4. The method of claim 3, where the predetermined amount of time is based on engine speed and driver-demanded powertrain torque.

5. The method of claim 1, further comprising downshifting a transmission in response to the decreasing difference between available powertrain torque and desired powertrain torque being less than a threshold.

6. The method of claim 5, further comprising ceasing to increase accelerator pedal application resistance in response to the decreasing difference between available powertrain torque and desired powertrain torque being less than a threshold.

7. The method of claim 1, where increasing accelerator pedal application resistance increases effort by the driver to apply an accelerator pedal to request additional torque.

8. A method for providing feedback from a vehicle powertrain to an appendage of a driver of the vehicle powertrain, comprising:
   increasing accelerator pedal application resistance to provide the feedback to the driver in response to an increasing difference between actual powertrain torque and desired powertrain torque.

9. The method of claim 8, further comprising filtering the desired powertrain torque.

10. The method of claim 8, further comprising increasing the accelerator pedal application resistance in response to a torque where a transmission is downshifted.

11. The method of claim 10, where increasing the accelerator pedal application resistance includes increasing the accelerator pedal application resistance proportionately to the increasing difference between actual powertrain torque and desired powertrain torque.

12. The method of claim 8, further comprising inhibiting downshifting for a predetermined amount of time in response to the increasing difference between actual powertrain torque and desired powertrain torque being less than a threshold.

13. The method of claim 8, further comprising downshifting a transmission in response to the increasing difference between actual powertrain torque and desired powertrain torque being greater than a threshold.

14. A system, comprising:
an accelerator pedal;
a vehicle powertrain including an engine;
a haptic actuator to increase and decrease resistance to applying the accelerator pedal; and
a controller including executable instructions stored in non-transitory memory for increasing accelerator pedal application resistance in response to a difference between available powertrain torque and predicted actual powertrain torque.

15. The system of claim 14, where increasing accelerator pedal application resistance in response to the difference between available powertrain torque and predicted actual powertrain torque occurs only in gears higher than a first transmission gear.

16. The system of claim 14, further comprising additional instructions to inhibit downshifting a transmission for a predetermined amount of time in response to the difference between available powertrain torque and predicted actual powertrain torque.

17. The system of claim 16, where the predetermined amount of time is based on engine speed.

18. The system of claim 14, further comprising additional instructions for downshifting a transmission in response to the difference between available powertrain torque and predicted actual powertrain torque being less than a threshold.

19. The system of claim 18, further comprising additional instructions for ceasing to increase accelerator pedal application resistance in response to the difference between available powertrain torque and predicted actual powertrain torque being less than a threshold.

* * * * *